Patented Oct. 11, 1927.

1,645,377

UNITED STATES PATENT OFFICE.

CARLETON ELLIS, OF MONTCLAIR, NEW JERSEY.

OIL HARDENING WITH NICKEL AND COPPER FORMATES.

No Drawing.   Application filed February 1, 1924. Serial No. 690,047.

This invention relates to a process of making catalyzers and relates particularly to nickel formate containing an added salt of an easily reducible character such as copper formate.

Nickel formate when heated in oil through which commonly hydrogen is bubbled reduces at 240–250° C. giving the nickel catalyst of an active character. At this temperature the oil is somewhat discolored and the flavor impaired for edible purposes (said oil acquiring a somewhat burnt taste) hence the oil used as a vehicle for reducing the formate is usually separated from the catalyst and sent back to the refinery for purification.

When, however, copper is also present in the form for example of copper formate reduction of the nickel takes place at a lower temperature, for example between about 180 and 190° C. Even 1 per cent of copper formate (in the mixture of nickel and copper formates) substantially reduces the temperature of reduction and with about 15 per cent of the copper compound satisfactory results may be obtained by reduction around 190° C. At this temperature the oil is not seriously impaired in color or flavor and may be hardened to the requisite degree for edible purposes.

As an illustration 85 parts by weight of nickel sulphate and 15 parts of copper sulphate are dissolved in water and the solution rendered alkaline with soda ash (sodium carbonate), washed and the wet precipitate dissolved in formic acid. The mixed formates are dried at about 80° C. They also might be used in the moist condition (i. e. without completely drying the same).

This product is introduced into an oil as for example cottonseed or soya bean oil to have present approximately the equivalent of .1 of 1 per cent of metallic nickel. The oil is heated and hydrogen introduced, reduction taking place at between 180–190° C. and on continuing the introduction of hydrogen the oil becoming hardened to such a stage of hardness as is desired. As the catalyzer is very finely divided, a bulking agent such as kieselguhr or silex may be added prior to filtration in order to render filtration easier.

Ordinarily I prefer a product containing between 10 and 20 per cent of copper calculated on the amount of nickel present.

If desired much larger amounts of the nickel and copper formate mixture may be first mixed with oil and a bulking material or filter aid medium to make a concentrate, and the latter added to the oil which is to be hydrogenated, in such proportion as will give the requisite amount of catalyst.

A typical procedure would be to churn up or grind nickel and copper formates (15 per cent copper formate to 85 per cent nickel formate) with a small quantity of oil and add the suspension to a batch of oil which is to be hardened using a quantity of the suspension sufficient to introduce one or two-tenths of a per cent of nickel. A bulking agent such as kieselguhr equal in amount to three to ten times the weight of the nickel formate copper formate mixture may be added to the oil at any suitable time, for example it may be mixed with the nickel and copper formates at the time they are churned up in oil to obtain a concentrated suspension, or it may be added to the batch of oil to be hydrogenated at any time during the hydrogenation operation. Its use is not to assist in the hydrogenation but merely to form a filter aid. The batch of oil to be hydrogenated is heated to between 180 and 200° C., hydrogen being slowly or rapidly bubbled through, the oil not necessarily being mechanically agitated. After a half hour or so the color of the oil, originally green due to the nickel and copper formates, becomes black due to the reduced metal in a finely divided and more or less colloidal form and when enough nickel in the catalytic form has been introduced the oil will begin to hydrogenate and the hydrogen may be introduced to keep a brisk current of the gas passing through the oil in order to have an abundance of the gas present. The gas need not be carried under high pressure in the hydrogenating vessel but may be introduced under only such a pressure as is necessary to force it readily through the oil. When the oil has reached a sufficient degree of consistency or hardness the catalyzer is removed by filtration or settling and the catalytic material may be used repeatedly until it has lost its power of inducing combination of hydrogen with oil. Any suitable apparatus may be employed for contacting the hydrogen gas with the oil and catalyzer as for example that set forth in Patent No. 1,084,203.

What I claim is:—

1. A composition intended for catalytic purposes comprising nickel and copper formates, the proportion of the copper being between 10 and 20 per cent of the amount of nickel present.

2. The process of hydrogenating oil which comprises subjecting oil containing nickel and copper formates to a temperature between 180 and 190° C. in the presence of hydrogen whereby a hydrogenating catalyst is obtained at a temperature below that at which the flavor of the oil would be seriously injured, and in continuing the introduction of hydrogen at approximately 180 to 190° C. whereby the oil is hardened.

3. In the hydrogenation of oil, the herein described improvement which comprises mixing with the oil to be hydrogenated, a mixture comprising nickel formate and copper formate, the former being in large excess over the latter, and thereafter heating the mixture to a temperature of about 180 to 190° C., while in the presence of hydrogen gas, whereby the copper and nickel formates are reduced to a highly catalytically-active state, and continuing the introduction of hydrogen gas, at about 180 to 190° C., until the said oil is hydrogenated, all without heating the said oil to a temperature substantially above 200° C., at any stage of the process, whereby a hydrogenated oil is produced free from those products of decomposition which would be formed at 200° C., and above.

CARLETON ELLIS.